(12) United States Patent
Zdych et al.

(10) Patent No.: US 8,251,873 B2
(45) Date of Patent: Aug. 28, 2012

(54) METHOD FOR ACTIVATING A CLUTCH

(75) Inventors: Robert Zdych, Friedrichshafen (DE); Michael Gromus, Eriskirch (DE); Claus Granzow, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 485 days.

(21) Appl. No.: 12/515,101

(22) PCT Filed: Nov. 5, 2007

(86) PCT No.: PCT/EP2007/061855
§ 371 (c)(1),
(2), (4) Date: May 15, 2009

(87) PCT Pub. No.: WO2008/064975
PCT Pub. Date: Jun. 5, 2008

(65) Prior Publication Data
US 2010/0056336 A1      Mar. 4, 2010

(30) Foreign Application Priority Data
Nov. 30, 2006   (DE) .................. 10 2006 056 515

(51) Int. Cl.
B60W 10/02 (2006.01)
B60W 10/04 (2006.01)
G06F 7/00 (2006.01)
G06F 17/00 (2006.01)
G06F 19/00 (2011.01)

(52) U.S. Cl. .......... 477/179; 477/175; 477/180; 701/67; 701/68

(58) Field of Classification Search .......... 477/174–176, 477/179, 180; 701/67, 68; 318/9, 12, 265
See application file for complete search history.

(56) References Cited

U.S. PATENT DOCUMENTS

| | | | |
|---|---|---|---|
| 5,743,368 A | 4/1998 | de Schepper et al. | |
| 5,905,346 A * | 5/1999 | Yamada et al. ................. | 318/50 |
| 6,079,536 A | 6/2000 | Hummer et al. | |
| 6,607,061 B2 | 8/2003 | Hori et al. | |
| 6,647,333 B2 * | 11/2003 | Jager et al. ...................... | 701/51 |
| 6,771,031 B1 | 8/2004 | Bai | |
| 6,823,754 B2 * | 11/2004 | Boll et al. ..................... | 73/865.9 |
| 7,032,733 B2 * | 4/2006 | Parigger ....................... | 192/84.6 |
| 7,522,984 B2 | 4/2009 | Karrelmeyer et al. | |
| 2002/0055415 A1 | 5/2002 | Yoshikawa et al. | |
| 2004/0116247 A1 | 6/2004 | Wakamatsu | |
| 2005/0233858 A1 | 10/2005 | Smith et al. | |
| 2011/0015842 A1 * | 1/2011 | Kume et al. ..................... | 701/67 |

FOREIGN PATENT DOCUMENTS

| | | |
|---|---|---|
| DE | 100 60 642 A1 | 6/2002 |
| DE | 102 03 640 A1 | 8/2002 |
| DE | 101 37 581 C1 | 1/2003 |
| DE | 103 28 712 A1 | 1/2005 |
| DE | 10 2005 030 185 A1 | 2/2006 |
| EP | 1 510 717 A1 | 3/2005 |
| JP | 2002-039231 A | 2/2002 |
| WO | 02/25131 A1 | 3/2002 |

\* cited by examiner

*Primary Examiner* — Tisha Lewis
(74) *Attorney, Agent, or Firm* — Davis & Bujold, P.L.L.C.

(57) ABSTRACT

A method for actuating a continuously variable clutch such that the torque to be transmitted by the clutch is continuously adjusted either electromechanically via an electromotive drive, hydraulically via a pressure actuator, or electromagnetically via an electromagnetic actuator. The torque transmitted by the clutch is adjusted by utilizing a position-dependent clutch torque specification.

7 Claims, 6 Drawing Sheets

METHOD FOR ACTIVATING A CLUTCH

This application is a National Stage completion of PCT/EP2007/061855 filed Nov. 5, 2007, which claims priority from German patent application serial no. 10 2006 056 515.0 filed Nov. 30, 2006.

FIELD OF THE INVENTION

The invention relates to a method for actuating a clutch.

BACKGROUND OF THE INVENTION

In continuously variable clutches of a drive train known from the state of the art, torque to be transmitted by the clutch is actuated either electro-mechanically via an electromotive drive, hydraulically via a pressure actuator, electromagnetically via an electromagnet, or continuously adjusted via an electromagnetic force actuator. For this purpose, in the known clutches the torque to be transmitted by the clutch is adjusted via a motor torque of the electric motor, via a clutch pressure of the pressure actuator or via an attractive force of the electromagnet, wherein when more clutch torque is to be transmitted, a greater motor torque, a greater clutch pressure or a greater magnetic attractive force is adjusted, whereas when less clutch torque is to be transmitted, a correspondingly lower motor torque, a lower clutch pressure or a lower magnetic attractive force is made available.

One disadvantage of the torque-based, pressure-based or force-based clutch torque specifications known from the state of the art is that strong hysteresis effects occur, which strongly influence the actuating accuracy of the torque to be transmitted by the clutch. With the clutch torque specification based on torque or pressure or force known from the state of the art accordingly only a low actuating accuracy for the torque to be transmitted by the clutch can be realized.

SUMMARY OF THE INVENTION

Based on this, it is an object of the invention to create a novel method for actuating a clutch, with which the actuating accuracy of the torque to be transmitted by the clutch can be more accurately adjusted.

The torque to be transmitted by the clutch is adjusted according to the invention by utilizing a position-dependent clutch torque specification.

In the spirit of the present invention, the torque to be transmitted by the continuously variable clutch is continuously adjusted with a position-dependent clutch torque specification, in particular via a cascaded position control. Hysteresis effects can be prevented in the adjusted clutch torque by means of the position-dependent or position-based clutch torque specification, whereby the actuating accuracy of the clutch torque can be clearly increased with only negligibly small hysteresis effects occurring.

According to a first advantageous embodiment of the invention, the clutch torque to be transmitted by the is electromechanically adjusted via an electric motor, wherein the position-dependent clutch torque specification takes place via a cascaded electric motor position control, electric motor speed control, and electric motor torque control, wherein an angle of rotation of the electric motor is regulated as an electric motor position, and wherein the electric motor torque is regulated as a function the electric motor position control and the electric motor speed control by utilizing a pilot control component for the electric motor torque.

According to a second alternative advantageous embodiment of the invention, the torque to be transmitted by the clutch is hydraulically adjusted via a pressure actuator, wherein the position-dependent clutch torque specification takes place via a cascaded clutch position control, clutch velocity control, and clutch pressure control, wherein a position of a movable part of the clutch is regulated as the clutch position, and wherein the clutch pressure is regulated as a function of the clutch position control and the clutch velocity control by utilizing a pilot control component for the clutch pressure.

According to a third alternative advantageous embodiment of the invention, the torque to be transmitted by the clutch is electromagnetically adjusted via an electromagnetic actuation device, wherein the position-dependent clutch torque specification takes place via a cascaded clutch position control, clutch velocity control, and clutch force control, wherein a position of a movable clutch part is regulated as the clutch position, and wherein the clutch force is regulated as a function of the clutch position control and the clutch velocity control using a pilot control component for the clutch force.

BRIEF DESCRIPTION OF THE DRAWINGS

Preferred refinements of the invention are disclosed in the following description. Exemplary embodiments of the invention are explained in more detail with reference to the drawings, without limiting the invention.

In the drawings.

DETAILED DESCRIPTION OF THE PREFERRED EMBODIMENTS

A first exemplary embodiment of the method of the invention for actuating a continuously variable clutch of a drive train is described in the following with reference to FIGS. 1 and 2.

Figure 1:
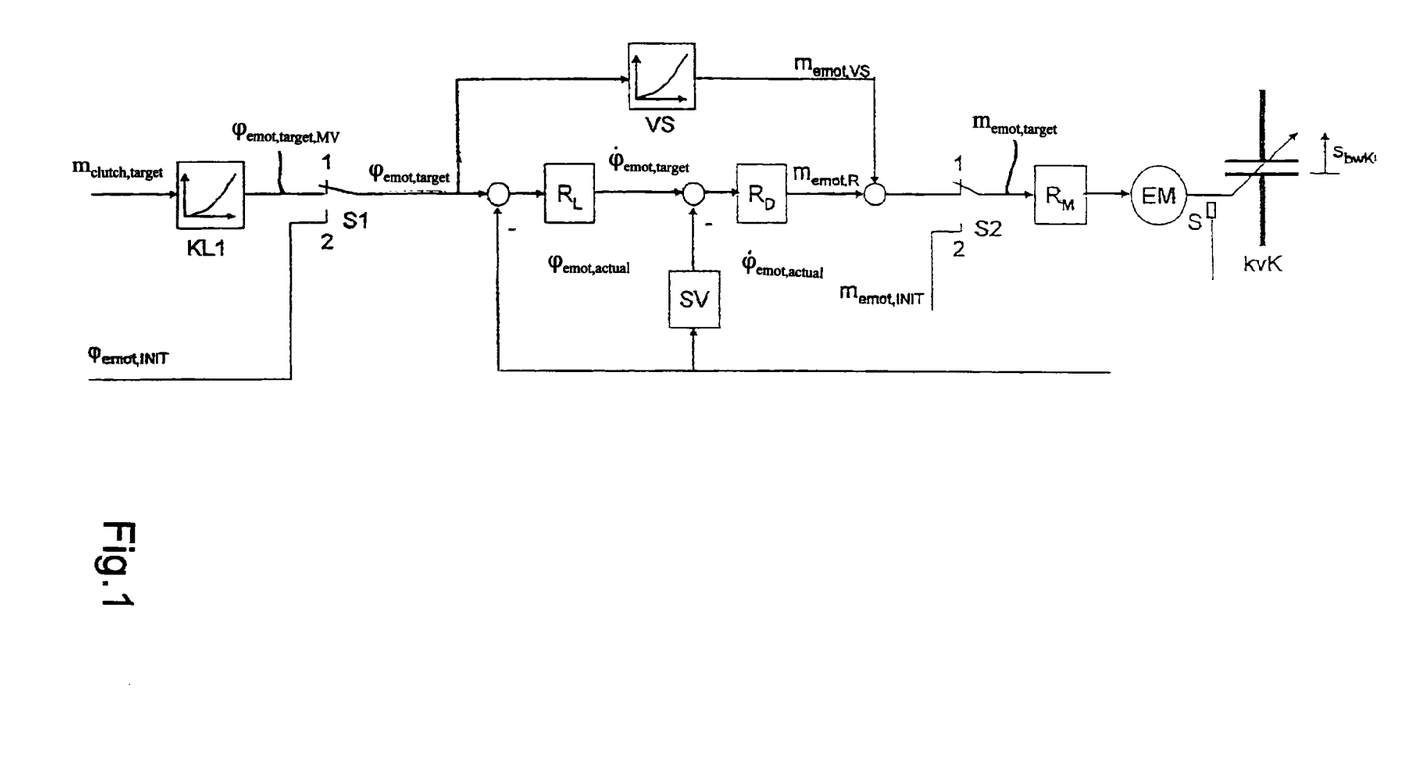
FIG. 1 shows a block circuit diagram of a controller structure for clarifying a first variation of the method according to the invention for actuating a clutch of a drive train.
Figure 2:
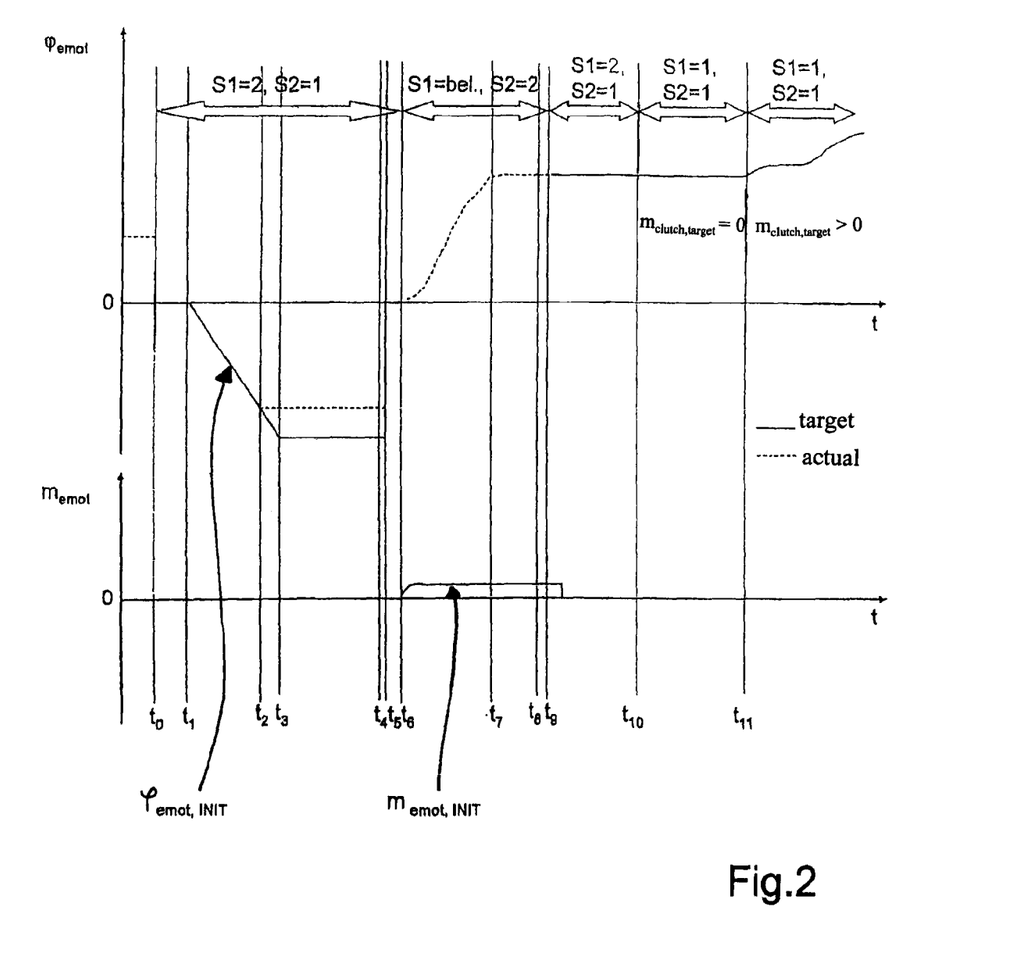
FIG. 2 shows a diagram for further clarification of the first variation of the method according to the invention.

In the exemplary embodiment of FIGS. 1 and 2, adjustment of the torque to be transmitted by the clutch is carried out electromechanically with the aid of an electric motor by utilizing the position-dependent clutch torque specification according to the invention.

FIG. 1 shows thus a control loop structure of the first exemplary embodiment of the method according to the invention, wherein a continuously variable clutch kvK is actuated, as already mentioned, via an electric motor EM. The position-dependent clutch torque specification is realized by means of a cascaded position control, wherein the cascaded position control according to FIG. 1 is carried out via a cascaded or mutually nested electric motor position control, electric motor speed control and electric motor torque control.

For this purpose, an angle of rotation of the electric motor is captured with the aid of a sensor S as the electric motor position, and a corresponding actual value $\phi_{emot,actual}$ of the angle of rotation is compared to a target value $\phi_{emot,target}$ for the angle of rotation of the electric motor EM, wherein the determined control deviation is fed to an electric motor position controller or position controller $R_L$. The position controller $R_L$ emits as an output variable a target value $\phi_{emot,target}$ for an electric motor speed controller or speed controller $R_D$, wherein this target value $\phi_{emot,target}$ emitted by the position controller $R_L$ is compared to a corresponding actual value $\phi_{emot,actual}$. This actual value $\phi_{emot,actual}$ is determined from the actual value $\phi_{emot,actual}$ measured by the sensor S via a signal processing unit SV, wherein the signal processing unit SV forms a time derivative of the actual value $\phi_{emot,actual}$ which was made available by the sensor S.

The speed controller $R_D$ for the electric motor EM transmits as output variable a signal $m_{emot,R}$, from which a target value $m_{emot,target}$ for an electric motor torque controller or torque controller $R_M$ of the electric motor EM is dependent. The electric motor torque is controlled by utilizing a pilot control component for the electric motor torque, wherein the signal $m_{emot,R}$ which was emitted by the speed controller $R_D$ is calculated with a signal $m_{emot,VS}$ emitted by a pilot control VS. From the addition of the signal $m_{emot,R}$ emitted by the speed controller $R_D$ and the signal $m_{emot,VS}$ emitted by the pilot control VS the target value $m_{emot,target}$ for the torque controller $R_M$ of the electric motor EM is obtained.

The pilot control VS for the electric motor torque is based on characteristic lines, wherein a corresponding characteristic line of the pilot control VS, based on which the pilot control variable $m\phi_{emot,VS}$ is determined as a function of the target position value or angle of target rotation value $\phi_{emot,target}$, is metrologically determined after the engagement of the clutch.

As already mentioned, the electric motor EM serves for actuating the continuously variable clutch kvK, which is to say the adjustment of a movable clutch part thereof. A fixed proportional interrelationship exists between the angle of rotation $\phi_{emot,actual}$ of the electric motor EM and a position or location $s_{bwKt}$ of the movable clutch part of the clutch kvK, so that a clutch position control, which is to say position control of the movable clutch part of the continuously variable clutch kvK, is carried out by means of the electric motor position control.

The target value $\phi_{emot,target}$ for the position or angle of rotation of the electric motor EM is derived from a target clutch torque $m_{clutch,target}$, wherein the target clutch torque $m_{clutch,target}$ is converted into the target angle of rotation $\phi_{emot,target,MV}$ on the basis of a characteristic line KL1. This characteristic line KL1 is likewise metrologically determined after the clutch is engaged, like the pilot control characteristic line VS.

A relative measuring angle of rotation sensor is utilized as the sensor S in the exemplary embodiment of FIG. 1, wherein the absolute position or location of the clutch kvK is determined at the start of an actuating function with the help of an initialization function when a relative measuring angle of rotation is used. The clutch position at a clutch application point is furthermore determined or ascertained, wherein the initialization function as well as the function for determination of the clutch position in the clutch application point will be described in more detail with reference to FIG. 2.

As an alternative to the arrangement of the sensor S on the electric motor shown in FIG. 1, the sensor can also be arranged directly on the clutch kvK, whereby a relative and also an absolute position measurement is carried out on the clutch, and a position or location $s_{bwKt}$ of a clutch part is determined instead of the angle of rotation of the electric motor $\phi_{emot}$. If an absolute measuring position sensor is used on the clutch kvK, the initialization process is advantageously omitted, as is shown, for example, in FIG. 2 within the period between 0 and $t_5$.

FIG. 2 shows two time signal characteristics, which is to say a time signal characteristic of the angle of rotation $\phi_{emot}$ of the electric motor, on the one hand, as well as a time signal characteristic of the electric motor torque $m_{emot}$, on the other hand.

Within the time interval defined by the times t=0 and t=$t_0$, the control is inactive and the movable clutch part of the continuously variable clutch kvK assumes an arbitrary position between a mechanical stop mA and an application point Ap of the clutch kvK. At the time t=$t_0$, the control is activated and the initialization function is started, wherein the initialization function runs between the times t=$t_0$ and t=$t_5$.

An initialization specification $\phi_{emot,INIT}$ (refer to FIGS. 1, 2) for the angle of rotation of the electric motor first has the target value zero; the angle of rotation of the electric motor $\phi_{emoti,actual}$ has a random value at the start of the control. At the time t=$t_0$, the random angle of rotation value or actual position value $\phi_{emot,actual}$ of the electric motor EM is first stored and subtracted as an offset correction from the measured actual value of the angle of rotation $\phi_{emot,actual}(t)$. The torque controller $R_M$ of the electric motor is then activated. The control difference, which is seen by the position controller $R_L$ between the times t=$t_0$ and t=$t_1$, is first zero because of the above-described mode of operation up to the time t=$t_1$. Starting at time t=$t_1$, a negative angle of rotation ramp $\phi_{emot,INIT}$ is predetermined as the target value until the mechanical stop mA is reached at time t=$t_2$ and the angle of rotation or actual position value $\phi_{emot,actual}$ stops. The angle of rotation ramp $\phi_{emot,INIT}$ is maintained, however, until a defined torque threshold of the electric motor is reached, due to the increasing control difference ahead of the position controller $R_L$ at the time t=$t_3$. This condition is maintained up to the time t=$t_4$, so that any possibly excited system vibrations have subsided by the time t=$t_4$. At the time t=$t_4$, the then available actual position value of the angle of rotation $\phi_{emot,actual}$ is again stored and subtracted at time t=$t_5$ as a further offset correction from the measured actual position value $\phi_{emot,actual}(t)$. The initialization specification $\phi_{emot,INIT}$ is set to zero at the time t=$t_5$.

Until time t=$t_6$, the target value of the angle of rotation and the offset-corrected actual value of the angle of rotation at the mechanical stop mA have the value zero. The location of the mechanical stop mA corresponds thus to the offset-corrected actual value $\phi_{emot,actual}$ of the angle of rotation=0. At the time t=$t_5$, the initialization of the absolute position value or absolute position of the angle of rotation is completed. As can be seen in FIG. 2, a switch S1 (refer to FIG. 1) assumes the switching position 2 and a switch S2 assumes the switching position 1 between the times t=$t_0$ and t=$t_5$.

At the time t=$t_6$, the switch S2 is transferred into the switching position 2, wherein the switch S2 maintains the switching position 2 up to the time t=$t_9$. The switching position of the switch S1 between the times t=$t_6$ and t=$t_9$ is arbitrary. The transfer of the switch S2 into the switching position 2 enables a direct torque specification for the electric motor EM. The predetermined target torque $m_{emot,INIT}$ is just sufficiently large to ensure that the movable clutch part of the clutch kvK can overcome any frictional resistance and thus runs until it has reached the application point Ap of the clutch at the time t=$t_7$. After further dwell time, which serves for the subsiding of the vibrations, at the time t=$t_8$ the offset-corrected actual position value of the angle of rotation $\phi_{emot,actual}$ is stored in a second independent memory as the target value $\phi_{emot,Ap}$ of the angle of rotation at the application point Ap and predetermined as the new target value for $\phi_{emot,INIT}$ at the latest starting at time $t=t_9$. Between the times $t=t_9$ and $t=t_{10}$, the characteristic line KL1 is corrected in such a way that the target clutch torque value $m_{clutch,target}=0$ supplies the target position value or target angle of rotation value $\phi_{emot,target}=\phi_{emot,Ap}$ at the application point Ap. Before the switch S1 is transferred into the switching position 1 at time $t=t_{10}$, $m_{clutch,target}=0$ is selected as the target value for the clutch torque. Starting at the time $t=t_{11}$, the determination of the application point of the clutch is completed.

The adjustment of the clutch torque can then take place on the basis of the target torque specification $m_{clutch,target}$ within the limit values occurring through the characteristic line KL1, wherein the switch S1 as well as also the switch S2 are transferred into the switching position 1 starting at the time $t=t_{10}$.

A trailing function, which transfers the switch S1 into the switching position 2 after the vehicle ignition is switched off and takes $\phi_{emot,INIT}$ back from the latest actual position value by means of an angle of rotation ramp with negative gradient to the value $\phi_{emot,INIT}=0$, can be realized in order to shorten the time period required for the initialization. In this way, the initialization duration can be shortened by the time period between the times $t=t_0$ and $t=t_2$, starting with the second initialization run that is performed, since the movable clutch part of the clutch is already located at the mechanical stop mA at the start of the respectively new initialization run when the vehicle is started.

According to a preferred refinement of the method according to the invention, a change in the interrelation between the target clutch torque $m_{clutch,target}$ and the target value $\phi_{emot,target,MV}$ of the electric motor position or the angle of rotation of the electric motor, which is characterized by the characteristic line KL1, can be compensated for by means of an adaptation. The same applies to the characteristic line VS. In this way, any signs of wear or aging in the transmission behavior of the clutch can be compensated for.

Figure 3:
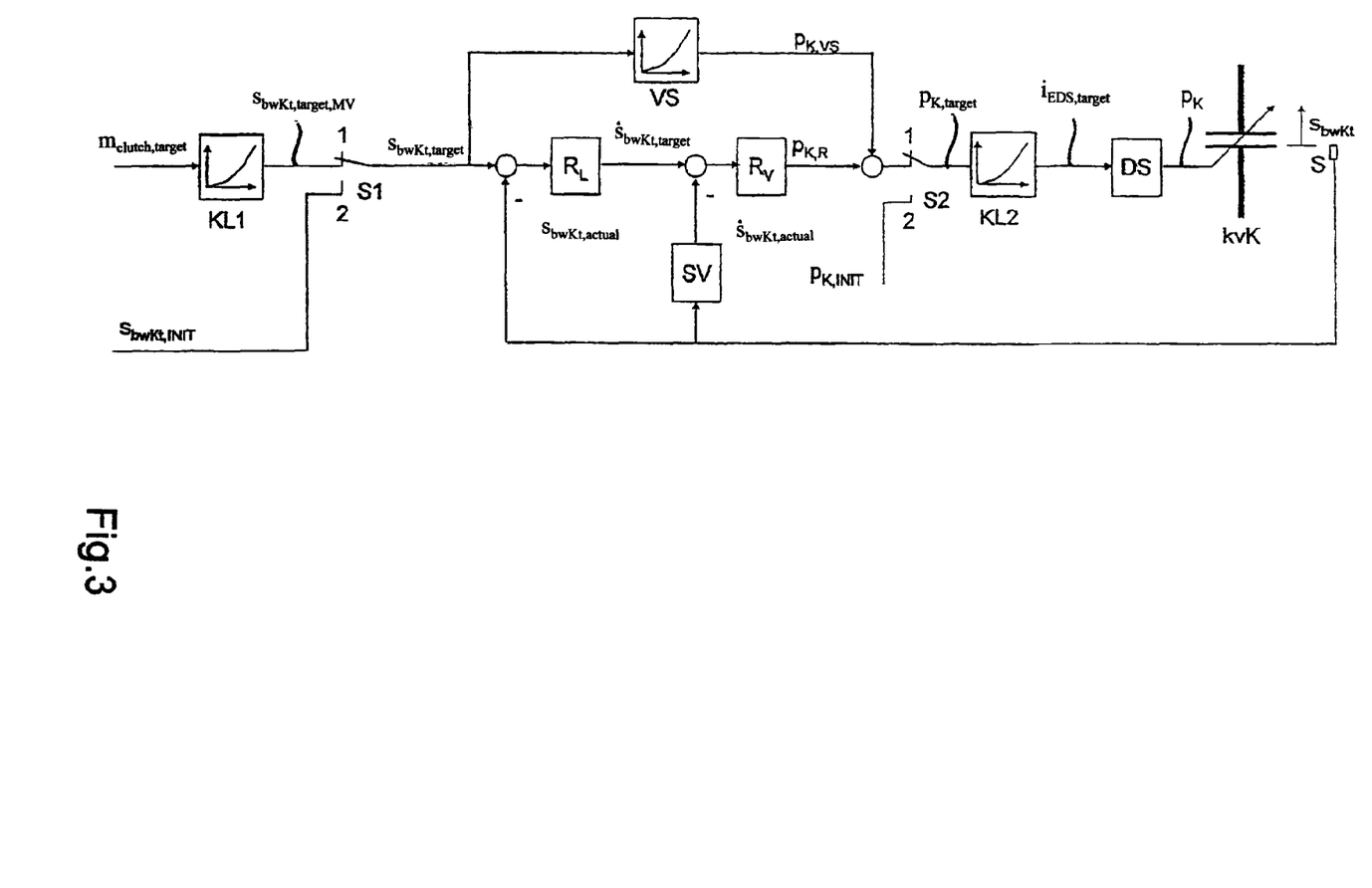
FIG. 3 shows a block circuit diagram of a controller structure for clarification of a second variation of the method according to the invention for actuating a clutch of a drive train.
Figure 4:
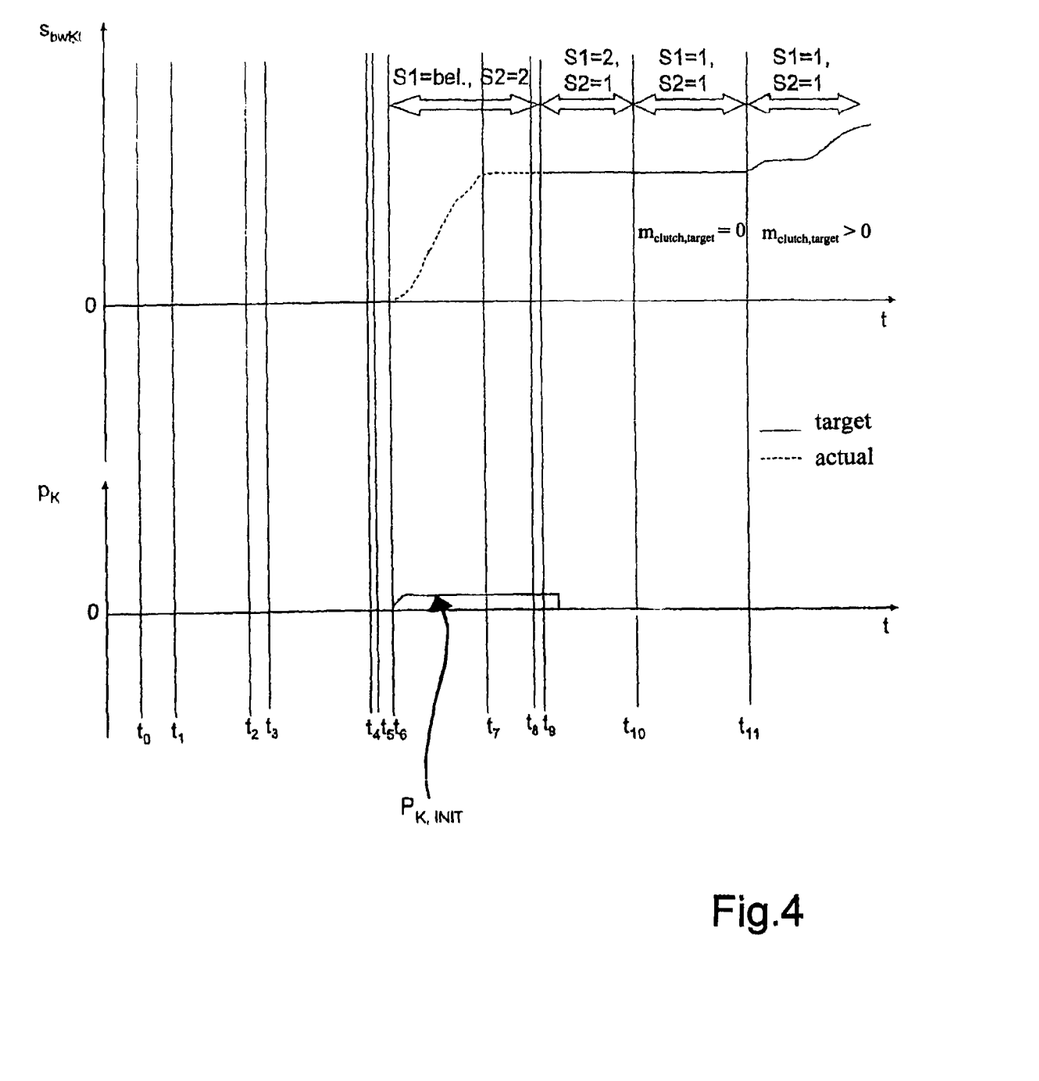
FIG. 4 shows a diagram for further clarification of the second variation of the method according to the invention.

FIGS. 3 and 4 clarify a second exemplary embodiment of a method according to the invention for actuating a continuously variable clutch kvK, wherein actuation of the clutch takes place hydraulically via a pressure actuator DS in the exemplary embodiment of FIG. 3, and namely using the position-dependent clutch torque specification according to the invention using a cascaded position control.

In the exemplary embodiment of FIG. 3, the position or location of a movable clutch part of the clutch kvK is measured directly, wherein a corresponding actual value $s_{bwKt,actual}$ is compared to a target value $s_{bwKt,target}$ for the position or location of the movable clutch part of the clutch. A control deviation determined in this way is fed, in turn, to a position controller $R_L$, which generates a target value $\dot{s}_{bwKt,target}$ for a velocity controller or filling volume flow controller $R_V$ for the clutch as the output variable.

This target value made available by the position controller $R_L$ is compared to a corresponding actual value $\dot{s}_{bwKt,actual}$, wherein this actual value $\dot{s}_{bwKt,actual}$ is in turn generated by a signal processing unit SV from the measured value of the sensor, and therewith from the actual clutch position value $s_{bwKt,actual}$, via a time derivative. The clutch velocity controller or clutch filling volume flow controller $R_V$ represents the output variable $p_{K,R}$, from which a target value for the clutch contact pressure $p_{k,target}$ is determined. The target value for the clutch contact pressure $p_{k,target}$ is determined from the output variable $p_{K,R}$ of the clutch velocity controller $R_V$ and the output signal $p_{K,VS}$ of a pilot control component VS for the clutch contact pressure. The pilot control VS generates the pilot control component $p_{K,VS}$ for the target value of the clutch contact pressure $p_{K,target}$ from the target position value for the clutch $s_{bwKt,target}$ on the basis of a characteristic line. This characteristic line of the pilot control VS is metrologically determined after the engagement of the clutch.

According to FIG. 3, the target value for the clutch contact pressure $p_{K,target}$ is converted with the aid of a characteristic line KL2 into a target current $i_{EDS,target}$ for the electric pressure actuator DS, wherein the pressure actuator DS makes available a clutch contact pressure $p_K$ for actuating the continuously variable clutch kvK on the basis of this target current.

The target position value for the clutch $s_{bwKt,target}$ is determined, in turn, by utilizing a characteristic line KL1 as a function of a target clutch torque $m_{clutch,target}$, wherein also this characteristic line is metrologically determined after the engagement of the clutch.

In the exemplary embodiment of FIGS. 3 and 4, in which the adjustment of the clutch torque is carried out hydraulically with the aid of a pressure actuator, an absolute measuring position sensor is preferably utilized as the sensor S, so that the necessity of an initialization function, which is required in the exemplary embodiment of FIGS. 1 and 2 by using a relative measuring angle of rotation sensor, does not apply. With respect to the remaining details, which is to say the function for determining the clutch position in the clutch application point as well as the adaptation for compensation of the changes of the characteristic line KL1 as well as the characteristic line VS induced by wear or aging, the exemplary embodiment of FIGS. 3 and 4 matches the exemplary embodiment of FIGS. 1 and 2, so that reference is made in this regard to the explanations concerning the exemplary embodiment of FIGS. 1 and 2 in order to avoid unnecessary repetitions. According to FIG. 4, the determination of the clutch application point starting at time $t=t_6$, proceeds in principle in the same way as in FIG. 2, with the difference that the position of the movable clutch part $s_{bwKt}$ is to be taken into consideration herein instead of the angle of rotation $\phi_{emot}$, and the clutch contact pressure $p_K$ is to be taken into consideration herein instead of the electric motor torque $m_{emot}$.

Figure 5:
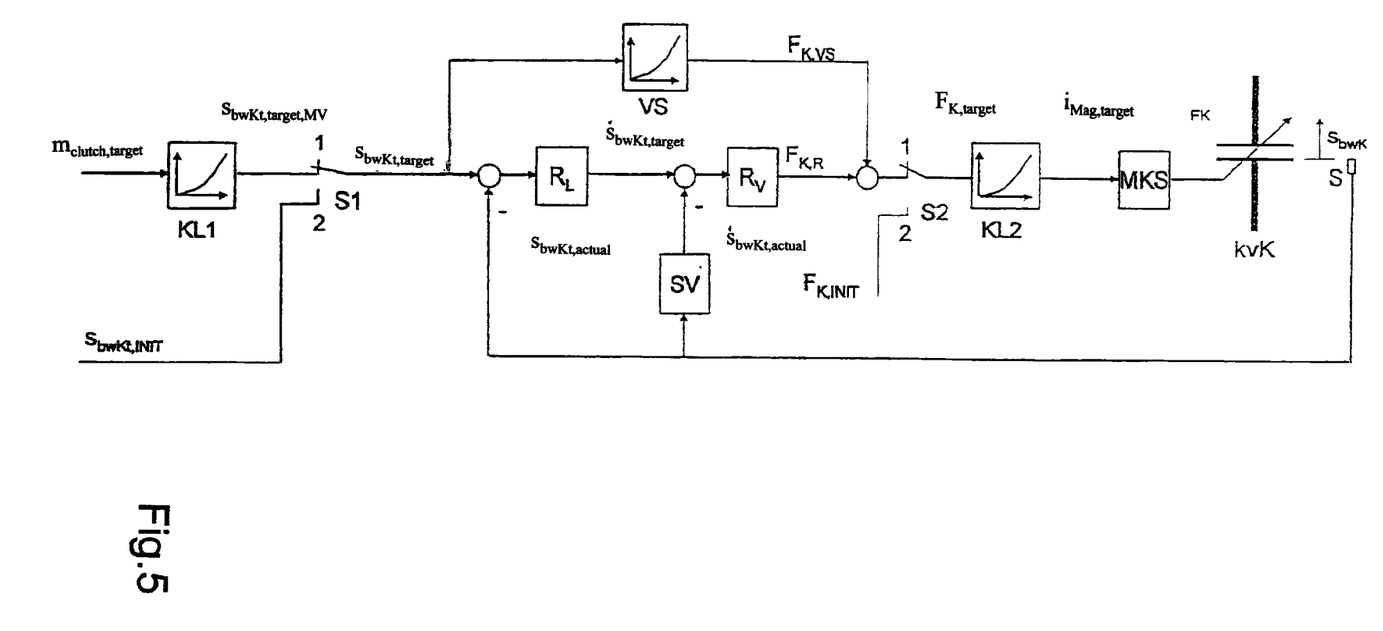
FIG. 5 shows a block circuit diagram of a controller structure for clarification of a third variation of the method according to the invention for actuating a clutch of a drive train.
Figure 6:
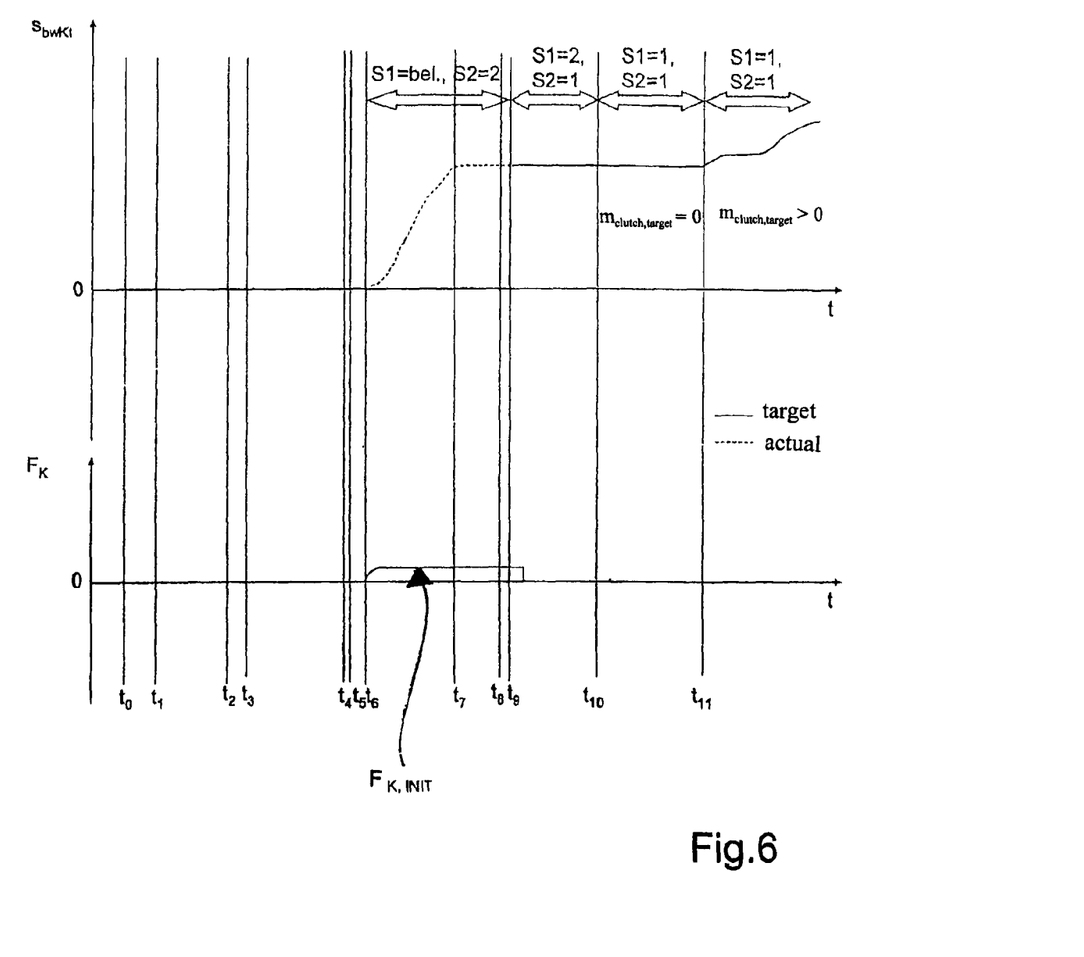
FIG. 6 shows a diagram for further clarification of the third variation of the method according to the invention.

FIGS. 5 and 6 clarify a third exemplary embodiment of a method according to the invention for actuating a continuously variable clutch kvK, wherein in the exemplary embodiment of FIGS. 5 and 6, the adjustment of the clutch torque takes place electromagnetically via an electromagnetic force actuator MKS by utilizing the position-dependent clutch torque specification according to the invention.

A cascaded position control is carried out herein just like in the exemplary embodiments of FIGS. 1, 2 and 3, 4, wherein the position-dependent clutch torque specification is carried out via a cascaded clutch position control, clutch velocity control, and clutch force control according to FIG. 5. An actual value $s_{bwKt,actual}$ of a movable clutch part of the clutch kvK made available by a sensor S is compared to a corresponding target position value $s_{bwKt,target}$, wherein the control deviation is fed to the position controller $R_L$, which makes available a target value $\dot{s}_{bwKt,target}$ as output value for the clutch velocity controller RV. This target value $\dot{s}_{bwKt,target}$ is compared to a corresponding actual value $\dot{s}_{bwKt,actual}$ for the clutch velocity control circuit or the clutch velocity controller $R_V$, wherein this actual value $\dot{s}_{bwKt,actual}$ is generated with the aid of the signal processing unit SV as a time derivative from the actual position value $s_{bwKt,actual}$ made available by the sensor S.

The clutch velocity controller $R_V$ generates an output variable $F_{K,R}$, wherein a target value $F_{K,target}$ for a clutch contact force is determined as a function thereof. The output variable of the controller $R_V$ is offset, in turn, with a corresponding output variable of a pilot control VS, as in the exemplary embodiments of FIGS. 1, 2 and 3, 4, wherein in the exemplary embodiment of FIG. 5, the variable $F_{K,VS}$ is determined for a characteristic line of the pilot control VS from the target position value $s_{bwKt,target}$ for the movable clutch part of the clutch. The target value $F_{K,target}$ for the clutch contact pressure determined from the variables $F_{K,R}$ and $F_{K,VS}$ is converted with the aid of a characteristic line KL2 into a target magnetic current $i_{Mag,target}$, on the basis of which the magnetic force actuator MKS makes available the clutch contact pressure $F_K$ for actuating the continuously variable clutch kvK.

The target clutch position value $s_{bwKt,target}$ is, in turn, determined from a target clutch torque $m_{clutch,target}$ by utilizing the characteristic line KL1. All of the characteristic lines, that is, the characteristic lines KL1 and KL2, as well as the characteristic line of the pilot control VS, are metrologically determined after the engagement of the clutch.

An absolute measuring position sensor is utilized again as the sensor S for determining the position of the movable clutch part of the continuously variable clutch kvK in the exemplary embodiment of FIGS. 5, 6, so that the necessity of the initialization function does not apply in agreement with the exemplary embodiment of FIGS. 3, 4 and in contrast with the exemplary embodiment of FIGS. 1, 2. The function for the determination of the clutch position in the clutch application point as well as the adaptation function for the compensation of changes of the characteristic line KL1 as well as the characteristic line VS induced by wear or aging are carried out in the exemplary embodiment of FIGS. 5, 6 again in agreement with the exemplary embodiment of FIGS. 1, 2, so that reference is again made to the exemplary embodiment of FIGS. 1, 2 in order to avoid unnecessary repetitions.

In the exemplary embodiment of FIGS. 5 and 6, however, the position $s_{bwKt}$ of the movable clutch part of the clutch is taken into consideration instead of the angle of rotation or the position $\phi_{emot}$ of the electric motor, and the clutch contact force $F_K$ is taken into consideration instead of the engine torque $m_{emot}$. The determination of the clutch application point starting at the time $t=t_6$ in FIG. 6 is carried out similarly as in FIG. 2, so that, as already mentioned, reference is made to the explanations concerning the exemplary embodiment of FIGS. 1, 2 regarding these details.

The invention claimed is:

1. A method for actuating a continuously variable clutch (kvK) in which clutch torque, to be transmitted by the clutch (kvK), is continuously electromechanically adjusted via an electric motor (EM), the method comprising the steps of:

determining and feeding a control deviation of an actual value ($\phi_{emot,actual}$) of an angle of rotation of the electric motor (EM) from a target value ($\phi_{emot,target}$) of the angle of rotation of the electric motor (EM) to an electric motor position controller ($R_L$);

determining and feeding a control deviation of a target value ($\phi_{emot,target}$) emitted by the electric motor position controller ($R_L$) from an actual value ($\phi_{emot,actual}$) to an electric motor speed controller ($R_D$), the actual value ($\phi_{emot,actual}$) is determined by means of a time derivative of the actual value ($\phi_{emot,actual}$) of the angle of rotation of the electric motor (EM) by a signal processing unit (SV); and adding a signal ($m_{emot,R}$) emitted by the electric motor speed controller ($R_D$) and a signal ($m_{emot,VS}$) emitted by a pilot control (VS) to a target value ($m_{emot,target}$) for a torque controller ($R_M$) of the electric motor (EM), and supplying the target value ($m_{emot,target}$) to the torque controller ($R_M$) of the electric motor (EM).

2. The method according to claim 1, further comprising the step of proportionally relating the actual value ($\phi_{emot,actual}$) of the angle of rotation of the electric motor (EM) and a position ($s_{bwKt,actual}$) of a movable clutch part of the clutch (kvK).

3. The method according to claim 1, further comprising the step of deriving the target value ($\phi_{emot,target}$) of the angle of rotation of the electric motor (EM) from a target clutch torque ($m_{clutch,target}$) via a characteristic line (KL1).

4. The method according to claim 3, further comprising the step of determining a clutch application point (Ap) and correcting the characteristic line (KL1) such that a target clutch torque ($m_{clutch,target}$) of zero, in the clutch application point (Ap), supplies the target value ($\phi_{emot,target}$) of the angle of rotation of the electric motor (EM).

5. The method according to claim 3, further comprising the step of metrologically determining the characteristic line (KL1) after an engagement of the clutch (kvK) and adaptively adjusting the characteristic line (KL1) to compensate for aging of the clutch.

6. The method according to claim 1, further comprising the step of basing the pilot control (VS) on a characteristic line, and generating a pilot control signal ($m_{emot,VS}$; $p_{K,VS}$; $F_{K,VS}$) on a basis of the characteristic line of the pilot control (VS) as a function the target value ($\phi_{emot,target}$; $s_{bwKt,target}$).

7. A method for actuating a continuously variable clutch (kvK) in which clutch torque, to be transmitted by the clutch (kvK), is continuously electromechanically adjusted via an electric motor (EM), the method comprising the steps of:

determining a control deviation of an actual value ($\phi_{emot,actual}$) of an angle of rotation of the electric motor (EM) from a target value ($\phi_{emot,target}$) of the angle of rotation of the electric motor (EM), and transmitting the control deviation of the actual value ($\phi_{emot,actual}$) of the angle of rotation of the electric motor (EM) to an electric motor position controller ($R_L$);

determining a control deviation of the target value ($\phi_{emot,target}$) of the angle of rotation of the electric motor (EM) emitted by the electric motor position controller ($R_L$) for an electric motor speed controller ($R_D$), transmitting the control deviation of the target value ($\phi_{emot,target}$) of the angle of rotation of the electric motor (EM) to the electric motor speed controller ($R_D$), determining the actual value ($\phi_{emot,actual}$) of the angle of rotation of the electric motor (EM) by a time derivative of the actual value ($\phi_{emot,actual}$) of the angle of rotation of the electric motor (EM) by a signal processing unit (SV); and adding a signal ($m_{emot,R}$) emitted by the electric motor speed controller ($R_D$) and a signal ($m_{emot,VS}$) emitted by a pilot control (VS) to a target value ($m_{emot,target}$) for a torque controller ($R_M$) of the electric motor (EM), and transmitting the target value ($m_{emot,target}$) the torque controller ($R_M$) of the electric motor (EM).

* * * * *